United States Patent Office 3,611,684
Patented Oct. 12, 1971

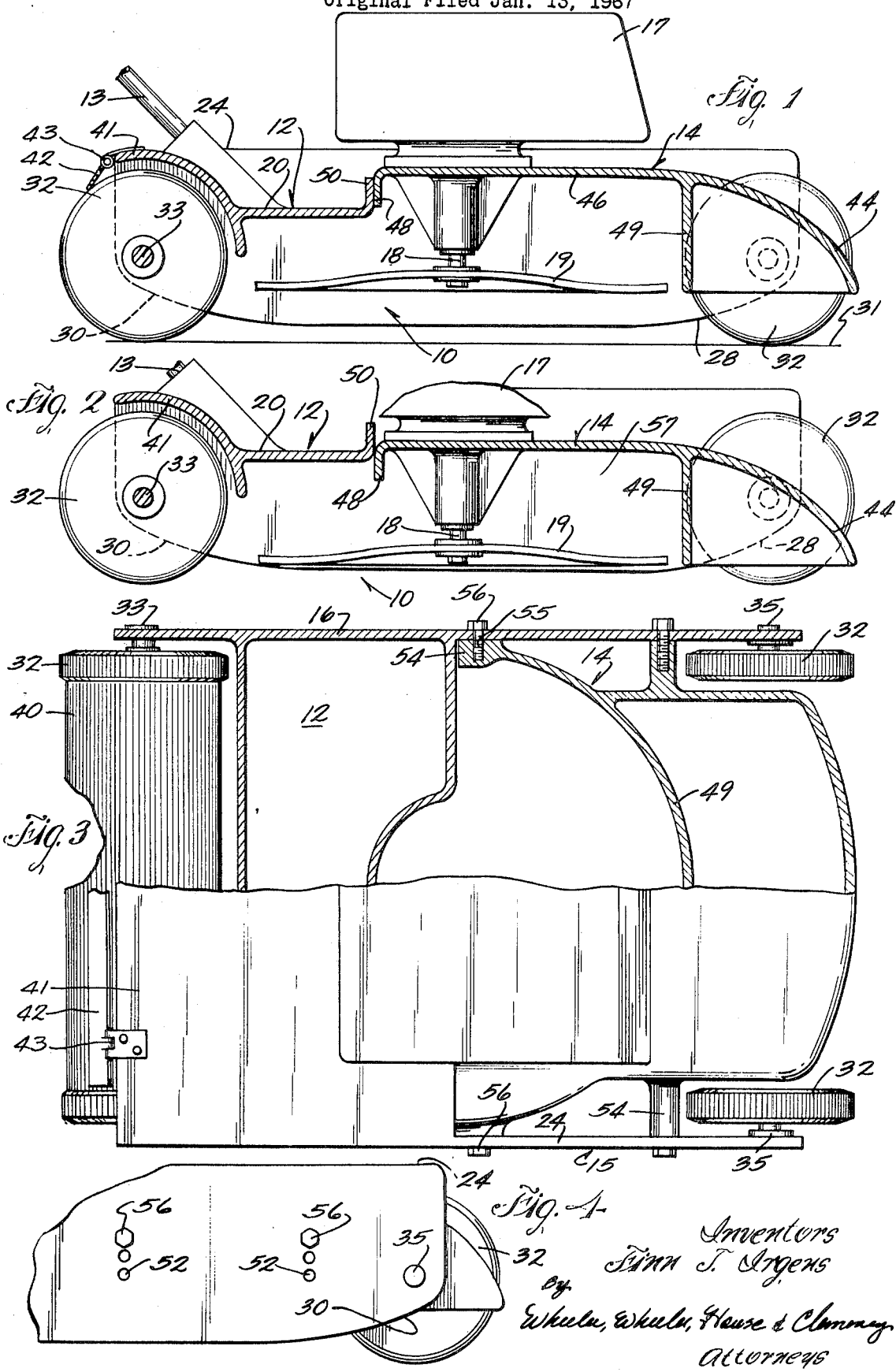

3,611,684
SAFETY SIDEWALL LAWN MOWER
Finn T. Irgens, Milwaukee, Wis., assignor to Outboard
Marine Corporation, Waukegan, Ill.
Continuation of application Ser. No. 609,076, Jan. 13,
1967. This application Feb. 20, 1970, Ser. No. 14,713
Int. Cl. A01d 35/26
U.S. Cl. 56—17.1
12 Claims

ABSTRACT OF THE DISCLOSURE

Disclosed herein is a rotary mower with safety sidewalls which depend from a blade housing section, which are at a constant clearance from the ground and which afford protection from ejection of missiles from beneath the mower. The sidewalls have wheel means for transporting the mower along the ground. The engine and blade are supported on a housing section which is located between the sidewalls and is vertically adjustable relative to the sidewalls to vary the height of grass cut. A roller between the rear wheels prevents rearward ejection of missiles.

This application is a streamlined continuation of earlier filed application, Ser. No. 609,076, filed Jan. 13, 1967, now abandoned.

BACKGROUND OF INVENTION

Various hazards are present in the operation of conventional rotary lawn mowers caused by impact of the cutting blade with objects such as stones or pebbles which can be impelled at high velocity from beneath the blade housing, endangering the operator and bystanders. Normally, the plane or track of the cutting blade is near the lower edge of the blade housing. In conventional mowers, the clearance between the lower edge of the housing and the ground normally varies between one and three inches as the mower is adjusted for different depths of cut, making it possible for objects to be thrown out or ejected from under the housing When the blade housing is adjusted for a short cut, the clearance between the housing and the ground is generally close enough to prevent missile escape. However, when the blade housing is raised to change the height of cut, the protection afforded by the housing decreases and accordingly the hazard to the operator and bystanders increases.

SUMMARY OF INVENTION

In accordance with the present invention additional protection is provided by side means on the mower which maintain constant clearance above the ground independent of the height of cut. This protection is afforded by a mower construction utilizing a blade housing having two sections. One housing section has depending side walls carrying front and rear wheels for travel along the ground and remains at a fixed height with respect to the ground. A second blade housing section movable between the side walls supports the engine and associated cutting blade. Forward ejection of missiles is minimized by an arcuate skirt which depends from the second housing section and which has a lower edge near the plane of the cutting blade. Vertical adjustment of the cutting blade to vary the height of grass cut is afforded by adjustably securing the second blade housing to the first blade housing. In its broadest sense, the invention encompasses side means with a deck adjustably mounted within the side means for supporting the engine.

Other safety features of the present invention include a freely rotating roller which is located between the rear wheels and which prevents rearward escape of missiles.

Further objects and advantages of the present invention will become apparent from the following drawings and accompanying description.

DRAWINGS

FIG. 1 is a partially broken away side elevational view of a rotary mower embodying various of the features of the present invention;

FIG. 2 is a side elevational view of the lawn mower of FIG. 1 with the blade and engine lowered for a short cut;

FIG. 3 is a partially broken away plan view of the mower shown in FIG. 1; and

FIG 4 is a fragmentary side elevational view of the mower shown in FIG. 1.

DETAILED DESCRIPTION

In the drawings there is illustrated a rotary mower which is generally designated 10, and which has handle 13 for guiding mower movement.

In accordance with the invention, protection from missile ejection caused by impact with the cutting blade is afforded by a construction utilizing first and second respective blade housing sections 12 and 14. The first housing section 12 has depending side walls 15 and 16 which maintain a constant clearance over the ground along the sides of the mower 10. The second housing section 14 is movable between the side walls 15 and 16 and supports a conventional engine 17 with a crankshaft or output shaft 18 carrying a cutting blade 19.

The first blade housing section 12 has a deck 20 integral with depending side walls 15 and 16. An alternate construction utilizes separate plates as side walls bolted or otherwise secured to the deck.

The side walls 15 and 16 have upper edges 24 and lower arcuate edge portions 28 and 30 adjacent the side wall ends to facilitate passage of the side walls over ground obstructions.

The mover 10 is supported for travel in adjacent relation to the ground 31 by wheels 32 rotatably mounted to the sidewalls 15 and 16 on rear axles 33 and front axles 35.

Further protection from flying objects is provided at the rear of the mower 10 by a drum or roller 40 carried by the rear axles 33 between wheels 32. The roller 40 can be barrel-shaped with a larger diameter at the center tapering to a smaller diameter at the ends thus providing a pivot for turning the mover 10. In the disclosed construction, the deck 20 has an arcuate portion 41 which partially encloses the roller 40, thereby blocking rearward exit of missiles. If desired, the deck 20 can extend to the roller 40 to provide adequate protection without employing the portion 41. Roller 40 should have sufficient clearance over the ground 31 to prevent undue drag on the mower 10. Removal of grass clipping and debris from roller 40 is afforded by a longitudinal blade or rubber flap which frictionally engages roller 40 and is pivotally connected at 43 to arcuate portion 41.

Protection at the front of mower 10 is afforded by an arcuate front end portion 44 which is integral with the second housing section 14 and which extends downwardly to the blade track.

Housing section 14 has a generally flat deck portion 46 to support any conventional engine 17. A downturned flange 48 at the rear of deck 46 is in abutting engagement with an upturned flange 50 of the first housing section 12, thereby sealing the housing cavity 57 to prevent missile escape upwardly, regardless of the vertical adjustment of the housing section 14 with respect to first housing section 12.

Housing section 14 is also provided inwardly of portion 44 with a forwardly located, transversely extending, depending arcuate skirt 49 which assists in stopping forward ejection of missiles and which extends downwardly near the plane or track of the cutting blade 19. Accordingly, the lower edge 57 of the skirt is maintained in a constant relationship to the plane or track of the cutting blade irrespective of vertical height adjustment of blade 19 to vary the height of cut.

The grass clippings can be disbursed against the roller 40 or accumulated and collected using a top discharge port such as that disclosed in U.S. Pat. No. 3,118,267, which port is not illustrated.

Means are provided for vertically adjustably securing the housing section 14 to the housing section 12 to afford selective height adjustment of the cutting blade. In the disclosed construction, such means comprises a series of vertically aligned apertures 52 in both side rails 15 and 16. Two embossments 54 which extend horizontally from the housing section 14 on opposite sides are provided with threaded apertures 55 to receive bolts 56 extending through apertures 52. To change the height of the blade 19 for the desired height of cut, the housing section 14 is manually raised and bolts 56 are extended through the appropriate apertures 52. This arrangement is one of many which could be used to afford height adjustment of the cutting blade.

Various of the features of the invention are set forth in the following claims.

What is claimed is:

1. A rotary lawn mower including a first blade housing section having depending sidewalls, front and rear wheel means supporting said first blade housing section for travel along the ground with the bottom of said sidewalls in adjacent relation to the ground, a second blade housing section having a forwardly located depending arcuate skirt with a lower edge, an engine mounted on said second blade housing section and having an output shaft carrying a cutter blade located in a plane near said lower edge, and means vertically adjustably securing said second housing section to said first housing section for providing selective height adjustment of said cutter blade, whereby said edge is maintained in constant relationship with said cutting blade irrespective of vertical height of the blade relative to the ground.

2. A rotary lawn mower including a first blade housing section having depending side walls, front and rear wheel means supporting said first blade housing section for travel along the ground with the bottom of said side walls in adjacent relation to the ground, a second blade housing section having a forwardly located downwardly extending arcuate portion, an engine mounted on said second blade housing section and having an output shaft carrying a cutter blade, and means vertically adjustably securing said second housing section to said first housing section for providing selective height adjustment of said cutter blade.

3. A rotary lawn mower including a first blade housing section having depending side walls, a vertically upturned flange extending transversely of the direction of intended travel, front and rear wheel means supporting said first blade housing section for travel along the ground with the bottom of said side walls in adjacent relation to the ground, a second blade housing section having a vertically downturned flange extending transversely of the direction of intended travel and in abutting engagement with said upturned flange, an engine mounted on said second blade housing section and having an output shaft carrying a cutter blade, and means vertically adjustably securing said second housing section to said first housing section for providing selective height adjustment of said cutter blade.

4. A rotary lawn mower including a pair of spaced side walls, front and rear wheel means supporting said sidewalls for travel along the ground with the bottom of said sidewalls in adjacent relation to the ground, a blade housing supporting an engine having an output shaft carrying a cutting blade, said blade housing having a forwardly located, transversely extending, depending arcuate skirt with a lower edge near the plane of said cutting blade, and means on said side walls adjustably vertically securing said housing to said sidewalls for providing selective height adjustment of said cutting blade.

5. A rotary lawn mower including a first housing section having depending side walls, front and rear wheel means supporting said first housing section for travel along the ground with the bottom of said side walls in adjacent relation to the ground, a second housing section, an engine mounted on said second housing section and having an output shaft carrying a cutter blade, and means vertically adjustably securing said second housing section to said first housing section for providing selective height adjustment of said cutter blade and for preventing location of said cutter blade below the bottom of said side walls.

6. A rotary lawn mower including a first housing having depending side walls, front and rear wheel means supporting said first housing for travel along the ground with the bottom of said side walls in adjacent relation to the ground, a second housing having an upper wall and a skirt depending from said upper wall and having a lower edge, an engine mounted on said upper wall and having an output shaft carrying a cutter blade rotatable in a plane spaced from said upper wall at approximately the same distance as said lower edge, and means vertically adjustably securing said second housing to said first housing with said skirt extending across the path of intended travel of said mower forwardly of said cutter blade.

7. A rotary lawn mower including a first housing section having side walls and a top wall extending between said side walls, front and rear wheel means supporting said first housing section for travel along the ground with the bottom of said side walls in adjacent relation to the ground, a second housing section having a vertically extending transverse front wall and an upper wall extending from said front wall between said side walls and adjacent to said top wall to provide a continuous upper deck extending from said front and side walls, an engine mounted on said upper wall and having an output shaft carrying a cutter blade located beneath said top and upper walls, and means vertically adjustably connecting said second housing section to said first housing section for providing selective height adjustment of said cutter blade while maintaining the continuity of said upper deck.

8. A rotary lawn mower including a first housing having depending side walls, front and rear wheel means supporting said first housing for travel along the ground with the bottom of said side walls in adjacent relation to the ground, a second housing having an upper wall and a skirt depending from said upper wall and having a lower edge, an engine mounted on said upper wall and having an output shaft carrying a cutter blade rotatable in a plane spaced from said upper wall at approximately the same distance as said lower edge, and means vertically adjustably securing said second housing to said first housing with said skirt extending across the path of intended travel of said mower forwardly of said cutter blade for providing selective height adjustment of said cutter blade and for preventing location of said cutter blade below the bottom of said side walls.

9. A rotary lawn mower including a first housing section having side walls, front and rear wheel means supporting said first housing section for travel along the ground with the bottom of said side walls in adjacent relation to the ground, a second housing section having a vertically extending transverse front wall and an upper wall extending from said front wall between said side walls to provide a continuous upper deck extending from said front and side walls, an engine mounted on said upper wall and having an output shaft carrying a cutter blade located beneath said upper wall, and means vertically adjustably connecting said second housing section to said first housing section for providing selective height adjustment of said cutter blade.

10. A rotary lawn mower in accordance with claim 9 wherein said means vertically adjustably connecting said second housing section to said first housing section also includes means for preventing location of said cutter blade below the bottom of said side walls.

11. A rotary lawn mower in accordance with claim 9 wherein said second housing section front wall has a lower edge and wherein said cutter blade is rotatable in a plane spaced from said upper wall at approximately the same distance as the spacing of said lower edge from said upper wall.

12. A rotary lawn mower in accordance with claim 9 wherein said second housing section front wall has a lower edge and wherein said cutter blade is rotatable in a plane spaced from said upper wall at approximately the same distance as the spacing of said lower edge from said upper wall, and said means vertically adjustably connecting said second housing section to said first housing section also includes means for preventing location of said cutter blade below the bottom of said side walls.

References Cited

UNITED STATES PATENTS

| | | |
|---|---|---|
| 1,954,579 | 4/1934 | Smith. |
| 2,726,503 | 12/1955 | Phelps. |
| 1,805,927 | 5/1931 | Sharp. |
| 1,831,681 | 11/1931 | Miller. |
| 2,810,251 | 10/1957 | Shippey. |
| 2,815,524 | 12/1957 | Mitchell. |
| 2,836,024 | 5/1958 | Davis et al. |
| 2,864,226 | 12/1958 | Bright. |
| 2,894,761 | 1/1959 | Knarzer. |
| 3,303,524 | 2/1967 | Schneider. |

LOUIS G. MANCENE, Primary Examiner

J. N. ESKOVITZ, Assistant Examiner

U.S. Cl. X.R.

56—320.1

PO-1050
(5/69)

UNITED STATES PATENT OFFICE
CERTIFICATE OF CORRECTION

Patent No. 3,611,684          Dated October 12, 1971

Inventor(s) Finn T. Irgens

It is certified that error appears in the above-identified patent and that said Letters Patent are hereby corrected as shown below:

Page 2, line 7    after "above", insert --- and in adjacent relation to ---;

Page 2, lines 20 through 23    delete "In its...engine.";

Page 2, line 21    insert the following: --- Also in accordance with the invention, the means vertically adjustably securing the one housing section to the other housing section also prevents location of the cutting blade below the side walls. ---;

Page 5, line 27 insert the following new paragraph:

--- As shown in the drawings, the means vertically adjustably securing the housing 14 to the housing section 12 to provide for selective height adjustment of the cuttint blade also serves for preventing location of the cutter blade below the bottom of the side walls. In this regard, as shown in Figure 2, even with the blade lowered for a short cut, the blade is still located above the lower edge of the side walls. ---.

Signed and sealed this 25th day of April 1972.

(SEAL)
Attest:

EDWARD M. FLETCHER, JR.
Attesting Officer

ROBERT GOTTSCHALK
Commissioner of Patents